United States Patent
Kern et al.

(10) Patent No.: US 10,852,122 B2
(45) Date of Patent: Dec. 1, 2020

(54) METHOD AND ARRANGEMENT FOR CAPTURING AN OBJECT USING A MOVABLE SENSOR

(71) Applicant: Carl Zeiss Industrielle Messtechnik GmbH, Oberkochen (DE)

(72) Inventors: Rudolf Kern, Aalen (DE); Guenter Grupp, Boehmenkirch (DE); Kai Schaeffauer, Munich (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/364,312

(22) Filed: Mar. 26, 2019

(65) Prior Publication Data

US 2019/0301851 A1     Oct. 3, 2019

(30) Foreign Application Priority Data

Mar. 27, 2018   (DE) .................. 10 2018 204 696

(51) Int. Cl.
*G01B 11/00* (2006.01)
*G01S 7/481* (2006.01)
(Continued)

(52) U.S. Cl.
CPC .......... *G01B 11/005* (2013.01); *G01S 7/4816* (2013.01); *G01S 7/491* (2013.01); *G01S 17/42* (2013.01); *G01B 2210/50* (2013.01)

(58) Field of Classification Search
CPC ........ G01S 17/42; G01S 7/491; G01S 7/4816; G01B 11/005; G01B 2210/50; G01B 21/045
See application file for complete search history.

(56) References Cited

U.S. PATENT DOCUMENTS 6,806,968 B2  10/2004  Ruck
7,367,133 B2   5/2008  Hagl et al.
(Continued)

FOREIGN PATENT DOCUMENTS

DE         208858 A1   6/1964
DE      10020842 A1  10/2001
(Continued)

OTHER PUBLICATIONS

"Confocal IDT IFS 2405", Micro-Epsilon Messtechnik GmbH & Co. KG.

*Primary Examiner* — Tony Ko
(74) *Attorney, Agent, or Firm* — Falk Ewers; Ewers IP Law PLLC

(57) ABSTRACT

A method and an arrangement for capturing an object by a movable sensor are provided. The method includes moving the sensor relative to the object and repeatedly ascertaining an instantaneous position of the sensor by a position measurement system, outputting the position to an evaluation device at a predetermined time point, repeatedly capturing the object by the sensor during a capturing time interval and outputting a measurement signal corresponding to the information captured during the capturing time interval. For at least one capturing time interval, a point in time of the capturing of the object is determined which lies within the capturing time interval, position values are ascertained and outputted at points in time which include the point in time of the capturing, and a position main value is ascertained based on the position values which approximates the position of the sensor at the point in time of the capturing.

13 Claims, 2 Drawing Sheets

(51) Int. Cl.
  *G01S 7/491* (2020.01)
  *G01S 17/42* (2006.01)

(56) References Cited

U.S. PATENT DOCUMENTS

2018/0017383 A1    1/2018  Sahlmann et al.
2018/0080766 A1*   3/2018  Johnson .................. G01C 3/08
2018/0203119 A1    7/2018  Kern et al.

FOREIGN PATENT DOCUMENTS

| DE | 10340803 A1 | 3/2005 |
| DE | 102015217637 A1 | 3/2017 |
| DE | 102016212650 A1 | 1/2018 |
| WO | 2005119173 A1 | 12/2005 |

\* cited by examiner

METHOD AND ARRANGEMENT FOR CAPTURING AN OBJECT USING A MOVABLE SENSOR

CROSS REFERENCE TO RELATED APPLICATIONS

This application claims priority to German patent application DE 10 2018 204 696.4, filed on Mar. 27, 2018, the entire content of which is incorporated herein by reference.

TECHNICAL FIELD

The disclosure relates to a method and to an arrangement for capturing an object by a movable optical sensor or by a movable sensor of a different type, which repeatedly captures the object during a capturing time interval. The disclosure in particular relates to contactless capturing of an object for example with a coordinate measuring machine (CMM) or an industrial robot, to which an optical, capacitive, or inductive sensor is attached to determine coordinates and/or dimensions of the object.

BACKGROUND

The use of CMMs for measuring coordinates of an object is known. The object can be, for example, a workpiece, an industrial product, and/or an assembly. The object is scanned with at least one sensor of the CMM, specifically by tactile probing of the object using a probe, and/or in a contactless manner. Contactlessly scanning sensors include optical sensors. Optical sensors are known for example in the form of laser triangulation sensors or cameras. Confocal white light sensors are another type of optical sensors. Their use as sensors in CMMs is known, e.g., from DE 103 40 803 A1.

A CMM is understood to mean a machine that can measure coordinates of an object, or more specifically an object surface, using at least one sensor. The present disclosure specifically relates to CMMs that can measure coordinates of surfaces and/or material interfaces of objects. The present disclosure furthermore specifically relates to CMMs that permit a relative movement of the sensor and of the object. Moreover, the disclosure is also directed at different movement apparatuses, for example in the form of an industrial robot, for moving the sensor relative to the object. The disclosure furthermore includes solutions in which a sensor is moved manually relative to an object, wherein a position of the sensor can be captured for example by camera monitoring or what is known as camera tracking.

One possibility for moving the sensor and the object relative to one another is offered by CMMs having one or more sensors that are movable relative to a static base. Examples are coordinate measuring machines having a portal design or a gantry design. The object to be measured is typically placed directly onto the static base, e.g., a measurement table, or above an object holder (e.g., a rotary table) on the base.

A confocal white light sensor, which is a type of optical sensor for use in a CMM in accordance with the present disclosure, is understood to mean a sensor that utilizes the principle of chromatic confocal distance measurement. White light (i.e., electromagnetic radiation, not necessarily visible, having radiation components of a plurality of wavelengths) is radiated by a light source onto a focusing optical unit. The focusing optical unit effects dispersion of the radiation, i.e., chromatic aberration occurs. As a result, the radiation components of the different wavelengths are focused at different distances from the focusing optical unit. If an object that reflects the radiation back in the direction of the sensor is located in the respective focus (focal point or focal line), the sensor detects radiation of the wavelength with maximum intensity that was reflected in the focus.

It is also possible that radiation of different wavelengths is reflected at the same time at their respective foci. In that case, the sensor detects in each case a (local) intensity maximum at these wavelengths. If the distance from the focus to the sensor (e.g., to the focusing optical unit) is known, it is possible to ascertain the distance between the sensor and the object from the wavelength of the single intensity maximum or from the wavelengths of the intensity maxima. However, this knowledge does not initially exist and is generally obtained by way of a reference measurement, in which the distance between the sensor and the reflection location is also measured in a different manner, e.g., by using a laser interferometer.

Confocal white light sensors are highly resolving and accurate distance sensors as compared to other distance sensors (such as capacitive sensors). White light sensors having a maximum resolution of, for example, a hundredth of a micrometer and measurement regions in the order of magnitude of several tenths of millimeters to several tens of millimeters are available on the market. One example of this is the confocal white light sensor with the type designation "Confocal IDT IFS 2405" from Micro-Epsilon Messtechnik GmbH and Co. KG, Ortenburg, Germany.

To determine the coordinates of the object, the sensor is used to produce sensor measurement signals, or sensor measurement values, which indicate for example in each case a distance between the sensor and the object surface, or from which said distance can be calculated. In a thickness measurement of typically at least partially transparent workpieces, the distance can also refer to a material interface which reflects back radiation. In particular, in this case at least two distance values can be obtained, wherein one can refer for example to a distance from the object surface and another to a distance from a material interface in a depth dimension of the object. The thickness of the object or of the measured material layer thereof can be determined from the difference between said distance values that has been corrected with the refractive indices (or the respective index of refraction) of the measured material.

Furthermore, a position value of the CMM is obtained, which is generally made up of a position or an actuating value of the individual axes of the CMM and can consequently also be referred to as the axis value. The position values can be ascertained and/or read by a position measurement system of the coordinate measuring machine, wherein the position measurement system captures for example the individual axis positions of the CMM and ascertains therefrom the position of a sensor arranged on the CMM. If no CMM is used, the position value can be determined using camera tracking or by a position measurement system of the movement apparatus.

An individual position value contains information relating to an adopted spatial position of the CMM and/or of the sensor at a given time point. In particular, the position values can be output at specified, previously determined, subsequently determinable and/or uniquely determinable time points, wherein the time points can define a position cycle. The position value can in particular indicate the position of a sensor positioned by the CMM or of a sensor interface positioned by the CMM. The position value can further include a plurality of components, for example an X-component, Y-component, or Z-component.

The sensor is moved by the CMM or in another way relative to and also along the object to produce sensor measurement signals (also referred to merely as sensor signal or signal below) for or at a plurality of measurement or scanning points. The producing and outputting of the signals can be effected in accordance with defined intervals or in accordance with a defined sensor cycle. The intervals or the sensor cycle can be defined by specified, previously determinable, subsequently determinable, and/or uniquely determinable time points at which the signals captured by the sensor can be output to an evaluation device, which can be provided for example in a CMM, if present.

The movement of the sensor is furthermore associated with changing position values of the CMM and/or of the sensor, in particular if the sensor is substantially continuously displaced relative to and along the object as part of what is called a scanning operation. Consequently, each sensor measurement signal can thus be uniquely assigned a position value, wherein the position value corresponds to the axis values or axis positions of the CMM or of another movement apparatus which were adopted during the object capturing by the sensor for producing said sensor measurement signal, and/or wherein the position value was determined directly on the basis of the sensor and for example using camera tracking.

As mentioned, the sensor measurement signals and the position values can be output, in accordance with a sensor cycle or in accordance with a position cycle, to an evaluation device, which ultimately performs an evaluation with respect to the object coordinates. It is possible here in each case to output a value after or during a predetermined cycle interval. The cyclic reading of sensor measurement signals and position values is also referred to as cyclic triggering of said information by the evaluation device. In particular when the sensor measurement signals are indirectly or directly related to a distance from the object, the evaluation device can add up the sensor measurement signals and associated position values in a known manner. This produces a total value from which the coordinates of the object can be derived. The ascertained coordinates can consequently refer to a coordinate system containing the base of the CMM. A thickness measurement of the object can likewise take place in the manner described above.

With respect to the sensor measurement signals, it should be taken into account that the measurement signals of the sensor generally need to be processed first to obtain the ultimate sensor measurement signals or sensor measurement values (for example by converting the measurement signals to a suitable format, by applying calibration factors, etc.). This can be accomplished within a sensor controller which outputs the sensor measurement signals to the evaluation device only with a time delay or, in other words, with a specific latency, due to the processing steps mentioned.

Additionally or alternatively, delays may occur due to the fact that the outputting of the sensor measurement signals to the evaluation device is effected via a communication bus. The transmission time required herefor and/or a waiting time until a sensor measurement signal can be transferred by the communication bus in accordance with a communication cycle thereof can likewise contribute to the occurrence of time delays or latencies.

As a result, a certain dead time can occur between the point in time of the capturing or detecting of the object or, in other words, a point in time of the capturing of measurement signals by the sensor, and the time at which the evaluation device ultimately receives an associated sensor measurement signal. This dead time can have, for example, a duration of several sensor cycles.

However, in order to ensure sufficient accuracy of the measurement results, it is generally advantageous to assign in each case the appropriate position value to an ascertained sensor measurement signal as part of the evaluation by the evaluation device. In particular, the sensor measurement signal and the position value should refer to the same time point (i.e., should be considered to be time-synchronous with one another and/or be assigned to one another). It is typical to take into consideration the position value which was present during the performance of the measurement for determining the sensor measurement signal (i.e., at the point in time of the capturing or detecting of the object by the sensor) or which was adopted here by the CMM and/or the sensor.

Therefore, approaches are known in which, under the assumption of a constant dead time between the object capturing and the obtaining of the sensor measurement signal by the evaluation device, time-synchronous value pairs of a sensor measurement signal and of a position value are at least approximated. For example, it is assumed that a sensor measurement signal is always obtained by the evaluation device only with a delay of two sensor cycles with respect to the point in time of the capturing thereof. If the obtained position values are stored and in particular continuously recorded, it is therefore possible for a currently obtained sensor measurement signal to read a position value which is offset by two sensor cycles with respect to the current evaluation time point in order to approximate a time-synchronous value pair. More specifically, a position value which occurred two sensor cycles ago with respect to the time point at which the sensor measurement signal was obtained is considered.

However, it has been shown that such assignment of position values and sensor measurement signals does not always ensure a desired measurement accuracy. The assumption of constant dead time generally constitutes an imprecise simplification. Even if this is tolerated, a suitable value for the dead time which is assumed to be constant can often be ascertained only empirically. This entails further losses in terms of accuracy.

SUMMARY

It is therefore an object of the present disclosure to improve the accuracy in particular when capturing an object by optical sensors.

This object is achieved by an arrangement and a method as described herein. It also goes without saying that, unless otherwise specified or evident, the features mentioned in the introductory description may also be provided individually or in any desired combination in the presently disclosed solution.

It has been found, inter alia, that in particular cases in which the capturing time, i.e., the time of the capturing of the object by the sensor, and the associated dead time are not uniquely predictable and/or vary cannot be captured with sufficient accuracy using the known approaches as a result of the disadvantages thereof. This can in particular be a result of the fact that the sensor during the capturing of the object requires a specific capturing time which is predictable only with difficulty and/or which can vary when capturing a plurality of scanning points.

A capturing time can generally be necessary if the sensor must integrate and/or cumulate incident radiation or comparable measured variables over a specific time duration for ascertaining an actual measurement signal. In the case of an optical sensor, this can relate to the integration of incident radiation using a photosensitive capturing or detector unit. A typical example of the capturing time is therefore a required exposure time during which a photosensitive capturing or detector unit of the sensor is exposed.

The disclosure is also applicable to sensors other than optical sensors which capture the object in each case within a capturing time duration so as to produce utilizable sensor information for the evaluation device. Examples of such sensors are capacitive sensors and inductive sensors which integrate over time intervals.

More specifically, the exposure time of an optical sensor serves for ensuring a sufficient total intensity of the incident radiation (i.e., a sufficient amount of radiation) such that measurement signals can be formed therefrom with a desired accuracy. This is relevant in particular when the intensity of radiation emitted by the sensor cannot or should not itself be increased further. In order to nevertheless obtain a sufficient evaluable amount of radiation, the exposure time (or generally also a capturing time) can be appropriately increased. In the case of charge-coupled device (CCD) or complementary metal-oxide semiconductor (CMOS) sensors, this for example allows for the incident radiation to be integrated over a longer period of time to increase the evaluable amount of radiation and to produce a sufficiently strong measurement signal. The exposure time can be varied for example by closing and opening what is known as a shutter, which is positioned, viewed from the object, upstream of the actual capturing unit of the sensor (for example upstream of a photosensitive detector surface).

When measuring objects, the intensity of the incident radiation depends on the reflectance of the object, which may be difficult to predict and/or can vary locally. Consequently, fluctuating intensities of the radiation captured by the sensor can occur even during a measurement along a continuous object surface. This may require a continuous adaptation of the exposure time (the general rule is, the lower the reflectance, the longer the exposure time required). Setting a suitable exposure time can be done in a known manner automatically via a sensor controller, and will be explained in more detail below.

If the capturing time of the sensor varies, the point in time at which the object is actually captured will also vary. The dead time between the point in time of the actual object capturing and the ultimate outputting/receiving of a sensor measurement signal consequently also varies. Even if, for simplification purposes, a constant capturing time were to be assumed, it is hardly possible due to the reflection properties of the object, which are difficult to predict, to predict the required capturing time and thus the actual point in time of the capturing and the resulting dead time. In any case, at least time-intensive test measurements for an object to be measured would be necessary herefor. Known solutions based on the assumption of a previously determinable and especially constant dead time are therefore applicable only in a trade-off with significant measurement inaccuracies.

For example, a sensor measurement value which was captured, due to the required capturing time, in the middle of a sensor cycle interval and which was additionally obtained by the evaluation device with two sensor cycles of processing and transfer dead time would have a total dead time of 2.5 sensor cycles. If, in accordance with the previous example, a constant dead time of two sensor cycles were to be assumed, said sensor measurement signal would erroneously be assigned a position value which occurred at a time point that is off, and in particular occurs later, by 0.5 sensor cycles. This would result in a time discrepancy between the mutually assigned sensor measurement signal and the position value.

This is critical in particular when the sensor is moved relative to the object and in particular when the sensor is moved substantially continuously or without interruption (for example in what is referred to as a scanning operation). Within the above-mentioned discrepancy of 0.5 sensor cycles, the CMM or the sensor can then already be at a position which differs from a position during the actual object and sensor measurement value capturing. The coordinate of the scanning point on the object ascertained based on the position value and the sensor measurement signal (and in particular a distance value derived therefrom) would therefore have a low accuracy.

For this reason, one approach of the disclosure is in particular to consider the actual point in time of the capturing of the object by the sensor while taking into account an applied capturing time duration. This is used in order to ascertain a position main value, which likewise refers to the actual point in time of the capturing. Consequently, it is thus possible to consider with a greater accuracy the position value that was actually present at the point in time of the object capturing. Since this can be accomplished separately for each sensor measurement signal, it is hereby possible to compensate even varying exposure times and associated varying dead times during object capturing.

In particular, a method for capturing an object using a movable in particular optical sensor includes:

moving the sensor relative to the object and repeated ascertaining of an instantaneous position of the sensor by a position measurement system, wherein each ascertained position is output to an evaluation device at a specified or determinable, i.e., predetermined point in time, wherein the sensor repeatedly captures the object during the duration of a capturing time interval, which is an exposure time interval, and outputs at a specified or determinable, i.e. predetermined point in time to the evaluation device a sensor measurement signal in each case corresponding to the information captured during a capturing time interval, wherein based on each sensor measurement signal a distance value is determined, and wherein for at least one of the capturing time intervals the following is performed:

determining a point in time of capturing which lies within the capturing time interval;

ascertaining position values that were output at points in time which enclose the point in time of the capturing between them;

ascertaining based on the ascertained position values a position main value which approximates the position adopted by the sensor at the point in time of the capturing, and combining the position main value and the distance value through calculation for determining a coordinate value of the object.

An arrangement for capturing an object using a movable in particular optical sensor includes:

a sensor, which is movable relative to the object;

a position measurement system, which is configured to repeatedly ascertain an instantaneous position of the sensor, and an evaluation device, to which each ascertained position is output by the position measurement system at a specified or determinable, i.e., predetermined point in time, wherein the sensor is configured to repeatedly capture the object during the duration of a capturing time interval, which is an exposure time interval, and to output at the specified or determinable point in time to the evaluation device a sensor measurement signal in each case corresponding to the information captured during a capturing time interval, wherein based on each sensor measurement signal a distance value is determined, wherein the duration of the exposure time interval is continuously adapted according to the reflectance of the object, and wherein the evaluation device is configured to perform the following for each of the capturing time intervals:

determining a point in time of the capturing which lies within the capturing time interval;

ascertaining position values that were output at points in time which enclose the point in time of the capturing between them;

ascertaining based on the ascertained position values a position main value which approximates the position adopted by the sensor at the point in time of the capturing, and combining the position main value and the distance value through calculation for determining a coordinate value of the object.

The arrangement may include any further step, any development and any further feature in order to provide all of the interactions, operating states and functions mentioned above or below. In particular, the apparatus may be designed to implement a method according to any of the aspects mentioned above or below.

The arrangement can in particular be a part of a CMM, that is to say the CMM includes the arrangement.

The sensor can be configured in accordance with any of the abovementioned aspects of the disclosure. In particular, an optical sensor can be embodied in the form of a white light sensor. The capturing time duration can take the form of an exposure time duration. The capturing time duration can be ascertained and/or determined automatically by a sensor controller or another control device of the arrangement, for example using a light meter. The light meter can include a light sensor including for example a photosensitive electrical resistor, e.g., a light dependent resistor (LDR).

The sensor can be arranged on a CMM and can be moved thereby. The CMM can further include the position measurement system and/or the evaluation device. Alternatively, the sensor can be arranged on a different movement apparatus for example in the form of an industrial robot. The sensor can likewise be moved manually. The position measurement system in both aforementioned cases can include a camera system for position tracking of the sensor, wherein the sensor includes for example suitable marks for camera capturing. The evaluation device can be a conventional personal computer (PC).

As mentioned, the points in time at which position values and sensor measurement signals are output can define a position cycle or a sensor cycle. These cycles can include a frequency of several hertz, several 100 Hz, or at least 1 kHz. Examples to be mentioned are a frequency of 1 kHz, 500 Hz and 100 Hz. The frequency of the position cycle can be generally selected to be of the same kind as that of the sensor cycle or can differ therefrom.

The sensor cycle and/or the position cycle can be divided into individual cycle intervals which are delimited in each case by a starting point in time and an end point in time. The starting point in time can coincide with an end point in time of a preceding cycle interval, and the end point in time can coincide with a starting point in time of a subsequent cycle interval. The starting point in time and the end point in time in turn can be defined by points in time at which position values or sensor measurement values are output.

After a cycle interval of the sensor cycle has taken place, in each case at least one sensor measurement signal can be output, wherein the sensor measurement signal can be based on object capturing by the sensor within the interval. However, in consideration of the dead times mentioned, the sensor measurement signal obtained by an evaluation device after a cycle interval has taken place can also be based on object capturing within another preceding cycle interval. The sensor measurement signal for the currently expired cycle interval would then likewise be obtained with a corresponding delay.

After a cycle interval of the position cycle has taken place, in each case at least one position value can be output, wherein the position value can refer to a current position (or at least a position within the current cycle interval) of the CMM and/or of the sensor that is coupled thereto. In consideration of any dead times, the position value can, however, also refer to a position during a preceding cycle interval. A dead time can occur for example due to the fact that the output position value is determined from averaging different individual values to increase the measurement accuracy.

The position value can be defined such that it is possible to at least indirectly calculate therefrom the position of the sensor. For example, the position value can relate to the position of a sensor interface of the CMM or of another movement apparatus, wherein it is possible, with knowledge of the dimensions of the sensor interface and/or of the sensor, to deduce a position of a predetermined region of the sensor (for example a position of the origin of a sensor coordinate system).

The sensor cycle and/or the position cycle can generally be regular (that is to say have a constant frequency) and output in each case at least one sensor measurement signal or position value at predetermined time intervals. The regularity can be achieved by way of the specified, previously determinable, subsequently determinable, and/or uniquely determinable points in time at which sensor measurement signals or position values are output being spaced apart from one another in a regular manner. In general terms, cyclic outputting of the sensor measurement values or position values can be effected, wherein the outputting is effected typically regularly in accordance with the sensor cycle or the position cycle.

The sensor can be continuously moved during the capturing of the object, in other words, without interruption. This can include a movement at a substantially constant or, alternatively, at a varying speed. Since a specific capturing time duration is necessary for capturing the object by the sensor, the latter can be moved along a surface region during the exposure, that is to say along a plurality of possible measurement or scanning points. The ultimately ascertained sensor measurement value and/or sensor measurement signal, which can refer in the aforementioned manner generally to at least one distance of the object (for example of the surface thereof and/or an internal material interface) from the sensor, can thus correspond to an average distance value, present during the exposure time duration, along the traveled surface region.

The point in time of the capturing can refer to the point in time that coincides with the center of the capturing time duration (or the duration of the capturing time interval) (that is to say coincides with a point in time at which half of the exposure duration has passed). For example, it can be determined by subtracting half the capturing time duration from an end point in time of a sensor cycle interval or by adding a sensor cycle interval to a starting point in time.

All of the points in time given above or below can be defined as absolute points in time, unless specified or apparent otherwise. Alternatively, they can be defined relative to a given and in particular relative to a current point in time (for example relative to an evaluation point in time). For example, the points in time can refer to a negative time axis, extending starting from the evaluation point in time. In this case, the points in time can indicate the temporal distance from the evaluation point in time (for example as a value of −4 ms).

The points in time which enclose the capturing point in time between them can enclose the latter in particular directly between them. For example, these may be the points in time which in each case directly neighbor the capturing point in time and at which a position value is outputted. In particular, the points in time can be points in time that delimit a position cycle interval containing the capturing point in time. The interval of the position cycle that contains the exposure point in time can be ascertained on the basis of the generally known position cycle frequency and/or in knowledge of a relative relationship between the capturing point in time and a given point in time (for example an evaluation point in time). If the central exposure point in time (that is to say the point in time located at the center of the exposure time interval or capturing time interval) for example lies 3.5 ms before the evaluation point in time and the position cycle frequency is 1000 Hz, then the interval of the position cycle that begins 4 ms before the evaluation point in time and ends 3 ms before the evaluation point in time is relevant (that is to say is the capturing time interval). The position values which are output at these points in time 4 ms before the evaluation point in time and 3 ms before the evaluation point in time and which were stored and/or recorded for example in accordance with one of the variants below can then be ascertained as the position values enclosing the capturing point in time.

As mentioned, the capturing point in time can be a mean point in time of the capturing time interval. In particular if the sensor and/or position measurement values change due to an accelerated movement within a capturing interval, the position and sensor capturing should refer to the same (capturing) point in time. In this case, the duration of a respective capturing interval, which defines for example an integration time over which the respective values are integrated, should also typically be of the same length. In the case of the accelerated movement, the mean point in time can be defined as something other than being located at the center of the capturing time interval: for example, the mean point in time can be the point in time at which the sensor has traveled half the total distance that is traveled during the capturing time interval.

The position main value is typically a value which has been ascertained purely by calculation on the basis of other position values rather than a position value which has actually been measured and/or output in accordance with the position cycle. The position main value can be assigned in accordance with the disclosure to the sensor measurement signal for which the capturing point in time has been determined. Additionally or alternatively, the position main value can be combined through calculation with that sensor measurement signal (and in particular a sensor measurement value or distance value derived therefrom) to determine a coordinate value of the object. This can be accomplished by an already described addition of said values. Alternatively, a thickness measurement can be performed by two distance values being ascertained at different material interfaces of the object (for example at an upper surface and a rear side and/or at an internal material interface) and by a difference being formed therefrom. The capturing point in time can in this case be assumed to be identical for both distance values. Exact assignment to the position value (or position main value) adopted during the thickness measurement may be necessary for example in order to be able to determine an exact thickness profile along or within the object. In other words, an exact position value in space and/or on the object can thus be assigned to the obtained thickness value. The position value in space can also be determined from the position main value, a second sensor measurement signal or distance value, and the orientation in space, wherein the latter can be determined for example from the apparatus moving the sensor and/or the joint angles thereof.

As mentioned, the capturing point in time can correspond to the mean point in time of the capturing interval, that is to say coincide with said point in time. In particular, the capturing point in time, which can generally be a concrete point in time along a defined time axis, can be calculated or determined on the basis of said average value, wherein the average value can coincide with the point in time of the capturing or exposure time interval that splits the time interval in two halves of equal size.

Furthermore, the capturing time interval can correspond to an exposure interval in which the sensor, which is in the form of an optical sensor, is exposed to light. Alternatively, the capturing time interval can correspond to an interval in which waiting for the receipt of back-reflected optical signals occurs, for example in the case of an optical sensor in the form of a time-of-flight camera. When this description mentions that a time interval corresponds to another time interval, this means in particular that the points in time at the beginning and end of the time intervals are the same.

According to an aspect of the method and of the arrangement, provision is made for the capturing time interval to have a predetermined relative relationship with respect to an output point in time of the sensor measurement signal and/or of a position value to the evaluation device, and/or to an interval of the sensor cycle that is at least in part parallel. The relative relationship can relate to a temporal relative relationship or, in other words, to a relative position along a common time axis of the capturing time interval and of the sensor cycle.

The relative relationship can generally be selected such that the capturing time interval ends at an end point in time of the sensor cycle interval and/or begins at a starting point in time of the sensor cycle interval. In particular, the capturing time interval can end at a point in time that coincides with at least one of the output points in time. Alternatively, an output point in time can divide the capturing time interval into two partial time intervals in accordance with the predetermined relative relationship, and/or the capturing time interval can include a predetermined temporal distance from the end point in time, starting point in time, and/or output points in time.

In knowledge of the relative relationship, in particular the central exposure point in time can be ascertained, for example when half the exposure time duration is subtracted from the end point in time or output point in time or is added to the starting point in time.

In accordance with a further exemplary embodiment of the arrangement and of the method, a plurality of the output position values are stored. Storing can be effected using a memory unit in which the position values are sorted or have been sorted in accordance with their reception point in time. The memory unit can be embodied for example as a rolling memory or as a first-in-first-out (FIFO) memory. The rolling memory can also be referred to as a ring memory or ring buffer. Generally, in this case a memory address can be cyclically increased, wherein, when an end of the memory area is reached, writing begins again at the start of the memory area and the data saved there are overwritten. Consequently, the memory area can be written quasi continuously.

In particular, storing the position values can be effected taking into account a respectively associated position cycle interval and/or a respective output time point. In other words, the position values can be stored such that their output points in time, associated position cycles, and/or a time sequence of the position values, which is determined by the output point in time and/or the position cycle, can be read or reconstructed. To this end, the position values can be provided with a digital time stamp and stored.

According to an aspect of the method and of the arrangement, the position main value is formed from averaging the ascertained position values, that is to say an average of the ascertained position values is formed. In particular, it is possible to form the arithmetic mean of the ascertained position values, which are assigned to the interval containing the central exposure time point, in order to ascertain the position main value. Alternatively, interpolation may be performed between the ascertained position values, in particular linear interpolation. All of the calculation methods mentioned can also be applied if more than two ascertained position values are available. This can in particular relate to the consideration of additional adjoining position cycle intervals explained below, wherein the position main value can be formed from an averaging of all position values of the individual intervals or from an interpolation on the basis of said values.

In accordance with a further aspect of the method of the arrangement, a further position value, which is or was output at a point in time that precedes or follows the position value output points in time that enclose the capturing point in time between them, is additionally ascertained for ascertaining the position main value. In particular, this position value can have been output at a point in time that delimits an interval of the position cycle which precedes or follows the interval that contains the central exposure time point. This further interval typically immediately precedes or immediately follows the position cycle interval with the central exposure time point, which means no other intervals are present between them. In other words, position values of a position cycle interval that adjoins the position cycle interval containing the central exposure time point can additionally be taken into consideration.

As a result, for example different position cycle and sensor cycle frequencies can be compensated. In particular, it is possible to take into consideration at least so many position cycle intervals and associated position values that the total duration of these position cycle intervals corresponds at least to the duration of a sensor cycle interval.

As mentioned, the arrangement and the method can further make provision for the ascertained position main value and the sensor signal for which the capturing point in time was determined to be assigned to one another. Alternatively or additionally, at least one property (for example a coordinate value or thickness value) of the object can be ascertained on the basis of the position main value and of the sensor signal. For example, a coordinate of at least one measurement point or, in other words, scanning point on the object captured by the optical sensor during the exposure time duration can be determined.

A further exemplary embodiment of the method and of the arrangement makes provision for the ascertaining of the position main value to be performed by an evaluation device operated in accordance with a system cycle as follows:

defining an ascertainment interval, which contains the capturing point in time and has the duration of an individual system cycle interval or an integer multiple thereof;

ascertaining position values output at points in time that delimit at least one time interval (and in particular in the form of an interval of the position cycle) which at least partially overlaps with the ascertainment interval; and ascertaining the position main value on the basis of the ascertained position values.

By ascertaining position values within the ascertainment interval or at the previously mentioned points in time, the evaluation for determining 3D object coordinates (or general position main values) is simplified and in particular the required computational power is reduced. In order to attain a high accuracy, in particular all position values that were output within the ascertainment interval or at the points in time mentioned can be ascertained. For example, all intervals of the position cycle including associated position values which overlap with the ascertainment interval can be considered. Ascertaining the position main value in turn can be effected on the basis of all the variants discussed above, for example by forming an average or by interpolation.

The ascertainment interval can relate to a time interval or define such a time interval. It is typically defined such that it centrally contains the capturing point in time, or, in other words, that the capturing point in time forms a temporal center of the ascertainment interval. The system cycle can be for example a central processing unit (CPU) cycle, a processor cycle, or a general computational cycle of the evaluation device. The system cycle in turn can be several 100 Hz or at least 1 kHz and can also be selected for example to be of the same type as the sensor cycle and/or the position cycle or include an integer multiple thereof.

Finally, general provision may be made for a coordinate determination and/or a thickness measurement to be performed on the basis of the sensor signal or signals.

BRIEF DESCRIPTION OF THE DRAWINGS

The disclosure will now be described with reference to the drawings wherein.

DESCRIPTION OF EXEMPLARY EMBODIMENTS

Figure 1:
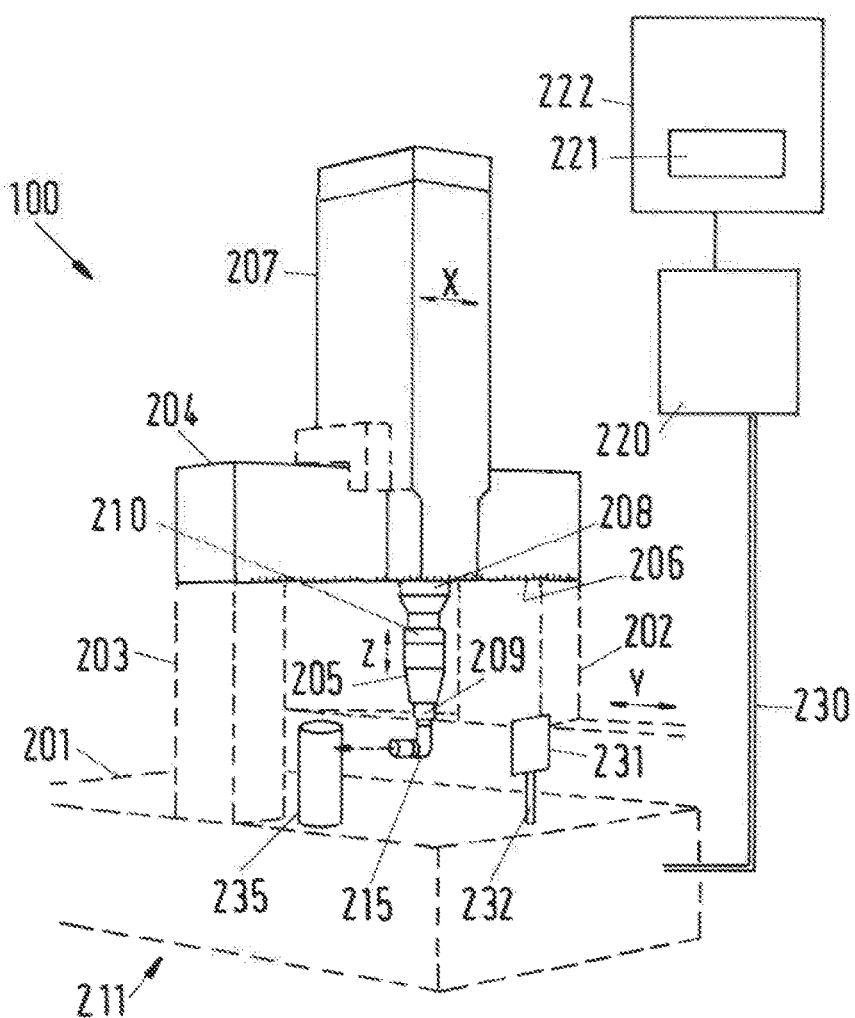
FIG. 1 shows a schematic illustration of an arrangement which carries out a method according to an exemplary embodiment of the disclosure.

FIG. 1 shows an arrangement 100 in accordance with an exemplary embodiment of the disclosure, wherein the arrangement 100 is configured to carry out all exemplary embodiments of the methods described below.

The arrangement 100 includes a CMM 211 with a portal design, which includes a measurement table 201, above which columns 202, 203 are arranged so as to be movable in the Y-direction of a Cartesian coordinate system. Together with a crossbeam 204, the columns 202, 203 form a portal of the CMM 211. At its opposite ends, the crossbeam 204 is connected to the columns 202 and 203, respectively. Electric motors, which are not depicted in more detail, cause the linear movement of the columns 202, 203 in the Y-direction, along the movement axis that extends in the Y-direction. For example, an electric motor is assigned here to each of the two columns 202, 203 or only to one of them (for example the column 202).

The crossbeam 204 is combined with a cross slide 207, which is movable, e.g., by way of air bearings, along the crossbeam 204 in the X-direction of the Cartesian coordinate system. The movement of the cross slide 207 along the movement axis in the X-direction is driven by at least one further electric motor (not illustrated). A quill 208, which is movable in the vertical direction, is mounted on the cross slide 207. Said quill is connected at its lower end to an interchange interface 209 by a mounting device 210 and a rotary apparatus 205. A white light sensor 215 is coupled to the interchange interface 209 via an angled holder. The interchange interface 209 can also be referred to as the sensor interface.

Due to the angulation, the measurement direction of the white light sensor 215 is approximately parallel to the XY plane. The interchange interface 209 can be moved relative to the cross slide 207 in the Z-direction, along the Z movement axis, of the Cartesian coordinate system, by way of being driven by a further electric motor. The white light sensor 215 that is coupled to the interchange interface 209 can be brought into virtually any position in the region below the crossbeam 204 by way of the electric motors of the CMM. Furthermore, the rotary apparatus 205 can rotate the white light sensor 215 about the Z-axis such that the white light sensor 215 can be oriented in different directions. Alternatively, rather than the rotary apparatus 205, a swivel apparatus that permits other degrees of freedom of movement, e.g., additional rotational movability about a rotational axis that extends perpendicular to the vertical (Z-direction), can be used.

Further depicted is an evaluation device 220 which receives the measurement signals from the white light sensor 215 via a schematically depicted connection 230. The connection 230 can be, for example, a light guidance means such as a fiber-optic cable. Unlike the illustration in FIG. 1, the connection 230 can be connected directly to the white light sensor 215.

Schematically illustrated in FIG. 1, moreover, is a controller 222 of the CMM 211 which controls in particular the drives (e.g., the abovementioned electric motors). In particular, the controller 222 is able to displace the white light sensor 215 into a desired position by controlling the drives and also to actuate the rotary apparatus 205 to orient the white light sensor 215 in a desired measurement direction.

The controller 222 is combined with a data memory 221, in which information concerning a relationship between measurement signals of the confocal white light sensor and an actual distance of the white light sensor from the surface of a measurement object 235 is stored. In order to ascertain such relationships, a reference body 231 is furthermore shown, which is connected to the measurement table 201 via a support 232. The purpose and use of the reference body 231 are known for example from DE 10 2015 217 637 A1, which is why a more detailed explanation is omitted at this point. The data memory 221 can also store subsequently explained position values and/or sensor measurement values and generally be embodied in the form of a rolling memory. Also stored in the data memory 221 is the spatial position of the individual axes with respect to one another, in particular the position of the white light sensor 215 with respect to the CMM axes and/or the angles with respect to the axis (for example in the form of a robot arm or limb) to which the sensor 215 is attached.

During operation, the CMM 211 moves the white light sensor 215 relative to the measurement object 235 to be measured by way of its individual axes and electric motors. More specifically, the white light sensor 215 is moved such that it contactlessly scans the surface of the measurement object 235 and in the process ascertains distance values between itself and the object surface for a plurality of individual scanning points or, in other words, measurement points. However, since the white light sensor 215 can also be moved during the measurement relative to the measurement object 235 and requires a specific capturing time for the measurement due to the exposure time duration, which will be explained below, the ultimately output distance value can also be an average distance value of points on the object surface, which are moved through the capturing region of the white light sensor 215 during the measurement.

The ultimately ascertained distance values form sensor measurement values of the white light sensor 215 (a distance value corresponds to a sensor measurement value). They are ascertained on the basis of sensor measurement signals which are output to the evaluation device 220 via the connection 230 and are converted there into corresponding measurement values. It should be noted that the sensor measurement signals obtained by the evaluation device 220 can already represent or contain finished distance values or thickness values, respectively, and/or sensor measurement values. To this end, signals captured by the sensor 215 can be directly evaluated and/or converted in a sensor controller.

In addition to the sensor measurement signals, the evaluation unit 220 also receives position values of the CMM 211, which describe an adopted position of the CMM 211 or of the individual axes thereof In particular, the position values can be values that describe an adopted position of the white light sensor 215 in a base coordinate system of the CMM 211 or from which said position can be ascertained. For example, the position values can indicate a position of the interchange interface 209. Outputting of the sensor measurement signals and of the position values is performed cyclically in accordance with a sensor cycle or position cycle, as will be explained below with reference to the further figures.

The position values are stored in the data memory 221 or in another memory device, which can be integrated for example in the evaluation device 220. In particular, they are stored such that their time sequence and typically also their concrete output and/or reception points in time can be reconstructed. This can be realized by using a rolling memory or a FIFO memory and/or by way of providing the position values with a digital time stamp.

Generally, a value pair can be formed from a position value and sensor measurement signal (which, within the context of the example shown, can generally indicate n distance and/or thickness values, wherein n corresponds to a natural number of 1 or more). When this refers to a common point in time and in particular to the point in time of capturing the measurement object 235 by way of the white light sensor 215, the values of this pair can be combined through calculation and/or can be assigned to one another. In particular, the values can be added up to determine a coordinate of the object surface of the measurement object 235 in the base coordinate system of the CMM 211 (that is to say a coordinate of the scanning point or of the scanning region in the case of a continuously moving measurement). Alternatively, the exact measured object location or another spatial coordinate can be assigned to a thickness value with the aid of the correspondingly assigned position value.

A plurality of corresponding coordinates can be used to check properties of the measurement object 235. These properties can be, for example, quality parameters such as size accuracy or surface quality.

However, as explained, the ascertainment of meaningful measurement results presupposes that the position values of the CMM 211 and the sensor measurement signals or sensor measurement values of the white light sensor 215 are assigned to one another in a meaningful way. In particular, value pairs which are as temporally synchronous as possible and relate to a common ascertainment point in time of the measurement object 235 by way of the white light sensor 215 should be used herefor.

Figure 2:
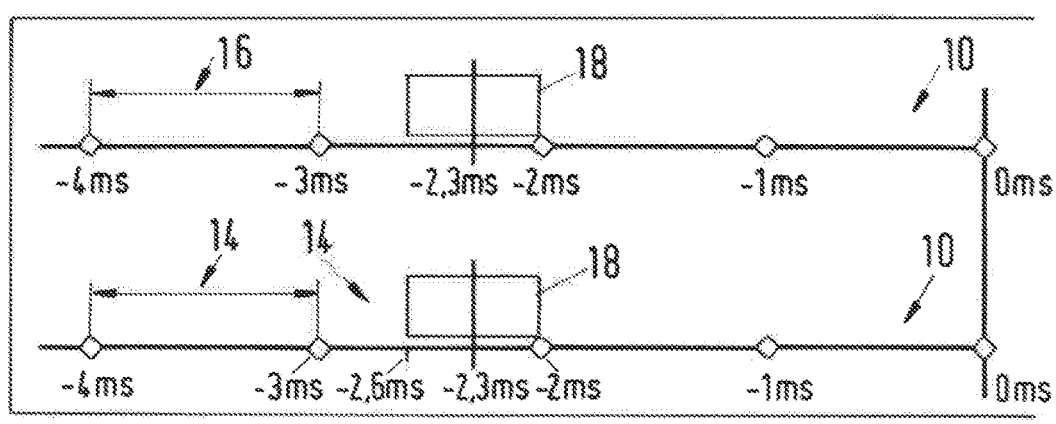
FIG. 2 shows an illustration for explaining the method in accordance with a first exemplary embodiment of the disclosure.

With reference to FIG. 2, the following description will initially discuss possible error potentials which have been identified by the inventors and which make a corresponding temporally synchronous assignment of the values mentioned more difficult.

FIG. 2 shows an individual evaluation cycle of the evaluation device 220, in which the coordinates for an individual scanning point or scanning region are ascertained. In other words, the evaluation cycle shown in FIG. 2 relates to an individual measurement cycle and can be repeated for each of the scanning points or scanning regions measured.

Specifically, as part of an evaluation cycle, coordinates for an individual scanning point or scanning region on the object surface are ascertained by considering in each case at least one position cycle and one sensor cycle interval 16, 14, which are assigned to one another and run at the same time or at least with a temporal overlap. The procedure which will be explained below with reference to FIG. 2 can consequently be repeated for each individual scanning point or scanning region, but in each case individual sensor cycle intervals or position cycle intervals are considered, which relate to the associated measurement process of the concrete scanning point.

Two time axes 10, 12 are depicted in FIG. 2. The upper time axis 10 represents a position cycle in accordance with which position values of the CMM 211 can be output to the evaluation device 220. The position cycle is defined by individual specified points in time at which in principle position values are output or could be output. These points in time are marked by points along the time axis 10.

The bottom time axis 12 represents a sensor cycle in accordance with which sensor measurement signals are output by the white light sensor 215 to the evaluation device 220. The sensor cycle is defined by individual specified points in time at which in principle sensor measurement signals are output or could be output. These points in time are marked by points along the time axis 12.

The two time axes 10, 12 are negative time axes, starting at a current evaluation point in time of 0 ms and extending in the negative direction. Illustrated in each case is a time duration of 0 ms to −4 ms. In other words, it is an illustration of individual cycle intervals located before the current evaluation time point of 0 ms, which intervals thus relate to an already finished object capturing, but for which the evaluation (i.e., coordinate ascertainment) still needs to be done.

It is apparent that the position cycle and the sensor cycle have an identical frequency of 1000 Hz. Accordingly, the duration of an individual position cycle interval 16 or of an individual sensor cycle interval 14 is 1 ms, as is indicated by way of example in FIG. 2 for in each case a sensor cycle and a position cycle interval 14, 16. For the intervals 14, 16 which have been highlighted by way of example in FIG. 2, the starting time point in each case is at −4 ms and the end time point at −3 ms.

The following description will initially deal with the bottom time axis 12 of the sensor cycle so as to explain the associated dead times. When the white light sensor 215 ascertains a distance value or distance signal, this information must initially be processed within the sensor controller. This can include for example evaluation of the measurement signals taking into account any calibration factors and/or conversion to a suitable digital format.

A time delay is furthermore due to the fact that the sensor measurement signal must be transferred to the evaluation device 220 via the connection 230. If the connection 230 is embodied in the form of a bus connection, it may be necessary to wait the length of specified time windows which are defined in accordance with a communication cycle of the bus connection 230. In the case shown in FIG. 2, this contributes to the fact that a currently captured sensor measurement value reaches the evaluation device 220 only with a time delay of at least 1 ms. For added safety, and to be able to compensate for even relatively long dead times which may occur, the evaluation device 220 assumes a system-inherent dead time of 2 ms. In other words, for any given evaluation point in time, always the sensor measurement signal that is offset by two sensor measurement cycles with respect to the evaluation point in time and which is located temporally in front thereof is considered to be current and to be used for the evaluation. In the exemplary embodiment shown in FIG. 2, this corresponds to an offset of −2 ms.

In FIG. 2, this means that, from the point of view of the evaluation point in time of 0 ms, the preceding sensor cycle interval 14 which lasts from −3 ms to −2 ms is considered. The exact point in time of the capturing within this sensor cycle interval 14, however, remains to be unknown. The reason for this in particular is that the white light sensor 215 requires an exposure time duration, which has already been mentioned, to be able to actually measure the object surface in a given scanning point or scanning region.

More specifically, in accordance with the sensor cycle, a sensor measurement signal is output at each individual cycle point in time or after each termination of a sensor cycle interval 14, that is to say for example also at −2 ms. This sensor measurement signal, however, was not captured at said point in time of −2 ms but within a capturing or exposure time interval 18, which lasts from −2.6 ms to −2 ms (that is to say it includes an exposure time duration of 0.6 ms). If a constant dead time of for example −2 ms were to be used as the basis, as is customary in the related art described in the introductory part, the assumption would be based on an incorrect point in time of the capturing of the sensor measurement signal.

This is an issue in as far as, as a consequence, an incorrect (because not temporally synchronous) value pair of sensor measurement signal (or distance value derived therefrom) and position value would also be formed. More specifically, the position values in accordance with the time axis 10, which is at the top in FIG. 2, are likewise output cyclically and in accordance with the position cycle with the identical frequency as the sensor cycle. That is to say, at each of the points in time shown in FIG. 2, and in particular at −2 ms, a position value is output which also describes with sufficient accuracy the actual position of the CMM 211 adopted at said time point. As described, said position value can initially be stored in the storage unit 221 and can be read therefrom when required.

With the assumption of constant dead times from the related art, the position value, which relates to the output time point of −2 ms, and the sensor measurement value, which was allegedly captured at the time point of −2 ms in the form of the sensor measurement signal, would therefore be added together to ascertain a coordinate of the object surface. Since, as has been found by the inventors, this assignment is possible due to the exposure time interval 18 only as part of an imprecise simplification, it is not possible hereby to obtain an accurate measurement result. This is true in particular of cases in which the white light sensor 215 is moved continuously within the meaning of a scanning operation. This is because in this case, it is also possible for a continuous change in the position values to occur within an individual sensor cycle interval 14. That is to say the position value for the actual point in time of the capturing within a sensor cycle interval 14 can significantly deviate from the position value at the end point in time of −2 ms.

In summary, the related art assumption of constant dead times between object capturing and the ultimate receipt of the sensor measurement signal or sensor measurement value by the evaluation device 220 has the result that, under certain circumstances, position values are considered which relate to points in time at which the object capturing by the white light sensor 215 did not take place or at least did not primarily take place.

For this reason, provision is made of estimating the actual point in time of the capturing of the white light sensor 215, wherein the former is selected in the exemplary embodiment shown in FIG. 2 to be a central point in time of the capturing. To this end, the exposure time duration of 0.6 ms, which was defined by the sensor controller based on an exposure measurement, which is known per se, is halved. This corresponds to a value of 0.3 ms. This is subtracted from an end point in time of the capturing interval 18 or is added to a starting point in time (in this case −2.6 ms) of the capturing interval 18.

In the case shown in FIG. 2, the fact that the capturing interval 18 is chosen such that it has an always specified relative relationship with respect to the sensor cycle interval 14 is utilized. More specifically, the exposure is performed by way of a sensor controller of the white light sensor 215 such that the exposure time interval 18 ends at an end time point of a sensor cycle interval 14, that is to say in the present case is terminated at the time point of −2 ms. This merely requires that the required exposure time duration is initially ascertained, whereupon the sensor controller appropriately defines the trigger point in time of the exposure such that the exposure interval 18 ends at a corresponding end point in time of the sensor cycle interval.

Overall, this means that the central exposure point in time in the exemplary embodiment shown in FIG. 2 is −2.3 ms. This time point is considered to be the actual point in time of the capturing or detecting of the measurement object 235 by the white light sensor 215 for the sensor measurement signal that was subsequently output at −2 ms.

Since the actual point in time of the capturing is thus known or at least approximated, the exemplary embodiment furthermore makes provision for also ascertaining a position value which was present at that actual point in time of the capturing. More specifically, the position value that was present at the central exposure point in time of −2.3 is to be ascertained or at least approximated. To this end, the position measurement values which were output at the points in time of −3 ms and −2 ms and consequently delimit the position cycle interval in which the central point of time of the capturing of −2.3 lies are considered. In particular, these points in time enclose the point in time of the capturing between them and, in the present case, also immediately between them (that is to say without further output points of time positioned between them). To illustrate this, the corresponding exposure interval 18 is also plotted in the upper time axis 10 in FIG. 2 (that is to say in the case of the position cycle).

In order to ascertain the actually relevant position value present at −2.3 (i.e., at the central exposure point in time), which in the context of the present disclosure is also referred to as the position main value, the position values output at −3 ms and −2 ms are combined through calculation with one another by the evaluation device 220. This can include in particular averaging of the corresponding position values.

For example, in the exemplary embodiment shown in FIG. 2, such averaging can be performed such that the position value output at −2 ms is multiplied by 0.7 and the position value output at −3 ms is multiplied by 0.3 in order to then form the sum of the correspondingly weighted position values. The result forms the position main value for the point in time of −2.3.

Consequently, the evaluation device 220 thus has a sensor measurement signal, or a distance value derived therefrom, which relates to the point in time of −2 ms but was actually captured, as computationally ascertained or at least estimated in accordance with the disclosure, at the actual point in time of the capturing of −2.3. Furthermore present is the position main value which relates to the time point of −2.3 and which was calculated in the above-mentioned manner (for example by the evaluation device 220 itself). It is thus possible to assign to the distance value a position value in the form of the position main value, which more precisely maps the position value at the actual point in time of the capturing of −2.3. By adding the position main value to the distance value, it is thus possible to significantly improve the accuracy when ascertaining the coordinate of the scanning point or scanning region measured within this measurement cycle. Adding can be performed for example in the form that the scaled direction vector of the (known) beam direction of the sensor is added to the position main value, wherein the length of the vector is defined by the distance value of the sensor.

For ascertaining a subsequent scanning point or scanning region, analogous time axes as illustrated in FIG. 2 can be considered. In particular, the evaluation point in time can again be defined as a point in time of 0 ms. A sensor measurement value obtained in this evaluation cycle can, in knowledge of the minimum dead time of −2 ms, which is assumed to be inherent to the system owing to the evaluation and communication processes mentioned, be assigned to a sensor cycle interval 14, which again extends from −2 ms to −3 ms. Accordingly, it is also possible to read from the memory unit 221 the position values that were present at those points in time (that is to say at −2 ms and −3 ms).

Despite concurrent time indications (see −2 ms and −3 ms), it is to be understood that the position values and sensor measurement values in this subsequent evaluation cycle differ from the preceding cycle. More specifically, it is a currently available sensor measurement value (or, in other words, the sensor measurement value which was output last) that is considered not the one that was already used in the preceding evaluation cycle for ascertaining a coordinate. Likewise, deviating position values are considered. In particular in the latter case, the consideration of current values (or position values) can be achieved in that the position values are read in sequence (for example from the memory unit 221). If those have already been used for a coordination evaluation, they are therefore not read again and can instead even be deleted.

In knowledge of the exposure time duration used for capturing the sensor measurement signal which is considered in the subsequent cycle, again the central point in time of the capturing can be ascertained. This central point in time of the capturing can be used analogously to the above-mentioned calculation variants to calculate a position main value from the associated position values (in particular from the position values output at the time points of −3 ms and −2 ms). Subsequently, the position main value and the sensor measurement signal, or a distance value derived therefrom, can be added up to ascertain the coordinates of the scanning point or scanning region measured in this measurement cycle.

Figure 3:
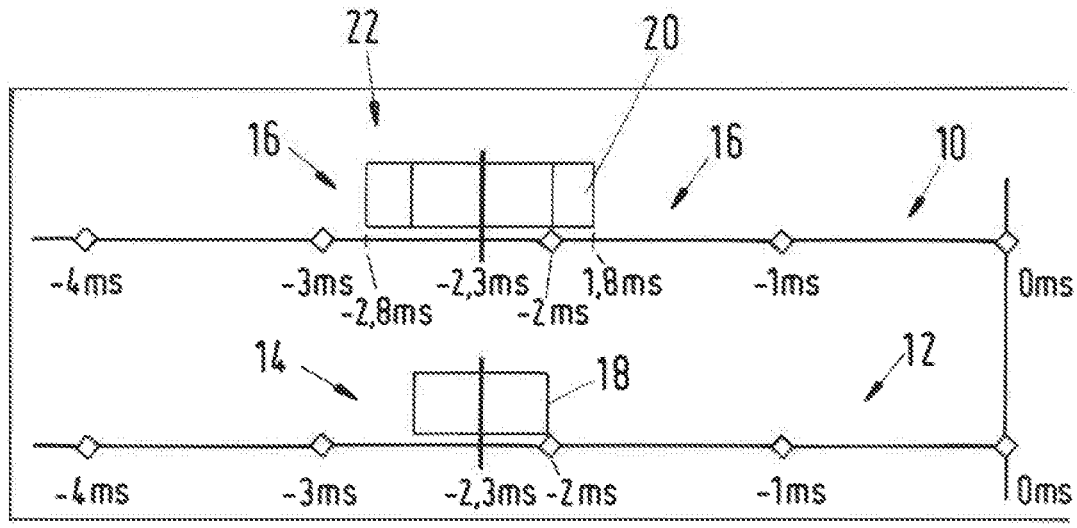
FIG. 3 shows an illustration for explaining the method in accordance with a second exemplary embodiment of the disclosure.

FIG. 3 shows a method according to a further exemplary embodiment of the disclosure, which can be carried out with the arrangement 10 from FIG. 1. Since this exemplary embodiment is substantially based on the principles explained above in connection with FIG. 2, the following description will merely deal with the essential differences from the exemplary embodiment shown in FIG. 2.

Shown in FIG. 3 once again is an upper time axis 10, which shows the position cycle in accordance with which individual position values are output (one position value after each position cycle interval is finished). Furthermore shown in FIG. 3 is again a bottom time axis 12, which shows the sensor cycle in accordance with which sensor measurement signals are output (one sensor measurement signal after each sensor cycle interval is finished). Both time axes start at a current point in time of the evaluation, which again corresponds to a point in time of 0 ms. Analogously to the preceding exemplary embodiment, initially a capturing or exposure interval 18 is considered again and, based thereon, a central point in time of the capturing is ascertained, which corresponds to an actual point in time of the capturing of the sensor measurement signal considered in this cycle (or at least approximates it). In the exemplary embodiment shown in FIG. 3, the central point in time of the exposure is again at −2.3.

However, for ascertaining the position main value, it is not merely the position cycle interval 16 that contains the corresponding central point in time of the exposure that is considered in this exemplary embodiment. Rather, in this exemplary embodiment, additionally a system cycle of the evaluation device 220 is taken into account. In order to limit the required computational power and in particular computational time, it has been proven advantageous for ascertaining the position main value based on the central point in time of the capturing to take entire system cycles or integer multiples thereof as the basis.

In the exemplary embodiment shown in FIG. 3, the cycle duration of an individual system cycle interval 20 is 1 ms (that is to say the system cycle has a frequency of 1000 Hz). To determine the position main value, in the case shown an ascertainment interval 22 is defined that corresponds to an individual system cycle interval 20 and thus likewise has a cycle duration of 1 ms. Furthermore, the ascertainment interval 22 is defined such that it centrally contains the central point in time of the capturing −2.3. As a consequence, it lasts from −2.8 ms to −1.8 ms. As is apparent from FIG. 3, it overlaps here with two neighboring position cycle intervals 16, with a first position cycle interval 16 lasting from −3 ms to −2 ms and a second lasting from −2 ms to −1 ms. Consequently, three points in time exist which delimit the respective position cycle intervals 16 that overlap with the ascertainment interval 22. The position values output at the corresponding points in time (−1 ms, −2 ms, and −3 ms) are read from the memory unit 221 by the evaluation device 220 and are taken as the basis for an ascertainment of the position main value. More specifically, weighting of the individual position values is effected again in the form of an averaging and taking into consideration the temporally relative relationship of the ascertainment interval 22 with respect to the corresponding points in time.

Specifically, the following weighting is selected in the exemplary embodiment shown in FIG. 3: The position value that was output at −1 ms is multiplied by 0.2, the position value that was output at −2 ms is multiplied by 1, the position value that was output at −3 ms is multiplied by 0.8. Next, the sum of the correspondingly weighted individual values is formed and divided by two. The result forms the position main value, which can be added to the sensor measurement signal, and/or the distance value derived therefrom, in the abovementioned manner to ascertain a coordinate value of the object surface or of the object.

Figure 4:
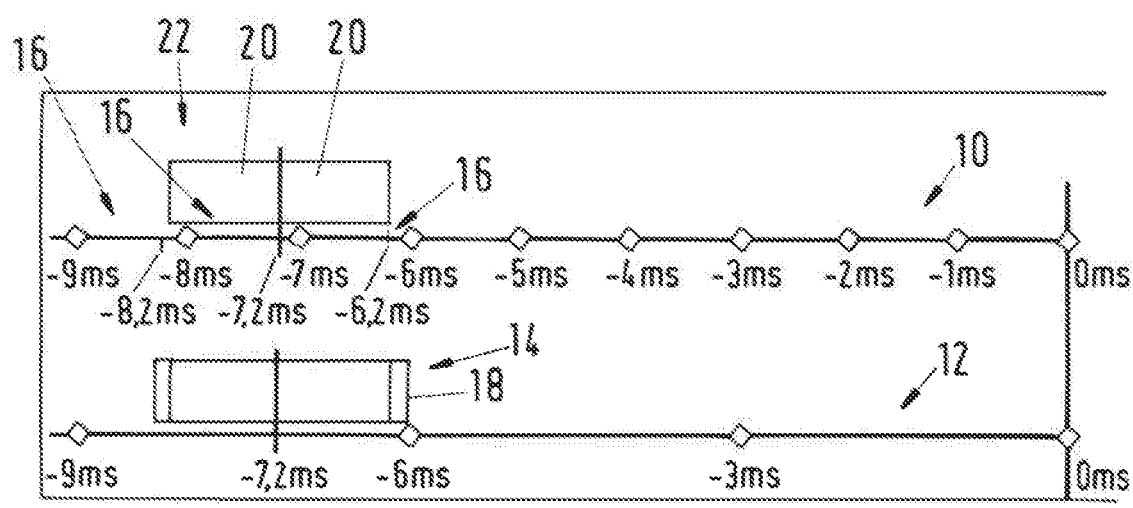
FIG. 4 shows an illustration for explaining the method in accordance with a third exemplary embodiment of the disclosure.

FIG. 4 shows a method according to a further exemplary embodiment of the disclosure, which is again based on the previously explained principles and which can be carried out using an arrangement 100, as shown in FIG. 1. Once again, the negative time axes extending from a current evaluation point in time of 0 ms are considered, wherein the upper time axis 10 represents the position cycle and the bottom time axis 12 represents the sensor cycle. It is immediately apparent that in this case the sensor cycle deviates from the position cycle. More specifically, the frequency of the sensor cycle is 333 Hz, while that of the position cycle is 1000 Hz. This makes longer exposure times within a sensor cycle interval 14 possible to be able to capture for example surfaces that reflect only weakly with a sufficient accuracy.

Once again, a constant dead time proportion of 2 sensor cycles is assumed, which is why a sensor measurement signal is considered that was output at the point in time of −6 ms and that was captured in the interval between −9 ms and −6 ms. The exact point in time of the capturing is again ascertained identically to the previous manner from a given exposure time duration. In the present exemplary embodiment, the exposure time duration is 2.4 ms. The central point in time of the capturing is therefore at −7.2 ms.

In order to calculate, or at least estimate, a position value at the time point of −7.2 ms, again a position main value is determined. To this end, analogously to the exemplary embodiment shown in FIG. 3, an ascertainment interval 22 is defined, which in this case is an integer multiple of the system cycle of 1 ms and therefore includes two system cycle intervals 20. More specifically, the duration of the ascertainment interval 22 is 2 ms.

Analogously to the explanation in connection with FIG. 3, all position cycle intervals 16 that overlap with the ascertainment interval 22 are considered for ascertaining the position main value. This applies to the interval lasting from −9 ms to −8 ms, to the interval lasting from −8 ms to −7 ms, and to the interval lasting from −7 ms to −6 ms. For this reason, for ascertaining the position main value, the position values that are output at −9 ms, at −8 ms, at −7 ms and at −6 ms are considered. These position values can in turn be averaged, in particular by using a weighting, which is based on a temporal relative relationship of the ascertainment interval 22 with respect to the individual position cycle intervals.

For the exemplary embodiment shown in FIG. 4, the position values which were output at −8 ms and −7 ms can be multiplied for example by the factor 1. The position value that is output at −6 ms can be multiplied by the factor 0.8, and the position value output at −9 ms by the factor 0.2. The weighted values can be added and subsequently divided by three. From the position main value ascertained in this manner, it is possible, identically to the previous exemplary embodiments, to again ascertain a coordinate value of the object surface or of the object.

It is understood that the foregoing description is that of the exemplary embodiments of the disclosure and that various changes and modifications may be made thereto without departing from the spirit and scope of the disclosure as defined in the appended claims.

What is claimed is:

1. A method for capturing an object by a sensor, the method comprising:
    moving the sensor relative to the object and repeatedly ascertaining an instantaneous position of the sensor by a position measurement system;
    outputting the instantaneous position to an evaluation device at a first predetermined point in time;
    repeatedly capturing the object by the sensor, each capturing taking place during a capturing time interval, the capturing time interval being an exposure time interval;
    outputting at a second predetermined point in time to the evaluation device a sensor measurement signal corresponding to information captured during the capturing time interval;
    determining a distance value based on the sensor measurement signal;
    continuously adjusting a duration of the exposure time interval in accordance with a reflectance of the object; and
    for each capturing time interval:
    determining a point in time of the capturing of the object which lies within the capturing time interval;
    ascertaining position values outputted at points in time which include the point in time of the capturing of the object;
    ascertaining a position main value based on the position values which approximates a position of the sensor at the point in time of the capturing of the object; and
    combining the position main value and the distance value when determining a coordinate value of the object.

2. The method as claimed in claim 1, wherein the point in time of the capturing of the object corresponds to a mean point in time of the capturing time interval.

3. The method as claimed in claim 1, wherein:
    the sensor is an optical sensor, and
    the sensor is exposed to light during the exposure time interval.

4. The method as claimed in claim 1, wherein the capturing time interval has a predetermined relative relationship with respect to a point in time of at least one of an output of the sensor measurement signal and/or an output of a position value to the evaluation device.

5. The method as claimed in claim 1, further comprising:
    storing a plurality of output position values together with a respectively associated point in time of an output.

6. The method as claimed in claim 1, further comprising:
    forming the position main value by averaging the position values.

7. The method as claimed in claim 1, further comprising:
    additionally ascertaining a further position value output at a point in time that precedes or follows points in time at which the position values are output and which include the point in time of the capturing of the object to ascertain the position main value.

8. The method as claimed in claim 1, further comprising:
    assigning the position main value to a sensor signal for which the point in time of the capturing of the object has been determined; and
    ascertaining at least one property of the object based on the position main value and of the sensor signal for which the point in time of the capturing of the object has been determined.

9. The method as claimed in claim 1, further comprising:
    assigning the position main value to a sensor signal for which the point in time of the capturing of the object has been determined.

10. The method as claimed in claim 1, further comprising:
    ascertaining at least one property of the object based on the position main value and of a sensor signal for which the point in time of the capturing of the object has been determined.

11. The method as claimed in claim 1, further comprising:
    ascertaining the position main value by the evaluation device operated in accordance with a system cycle by:
    defining an ascertainment interval, which includes the point in time of the capturing of the object and which has a duration of an individual system cycle interval or of an integer multiple thereof;
    ascertaining the position values outputted at points in time which delimit at least one time interval which at least partially overlaps with the ascertainment interval; and
    ascertaining the position main value based on the position values.

12. The method as claimed in claim 1, further comprising:
    performing at least one of (a) a coordinate determination and (b) a thickness measurement based on a sensor signal.

13. An arrangement for capturing an object, the arrangement comprising:
    a sensor configured to be movable relative to the object, and to repeatedly capture the object, each capture taking place during a capturing time interval, the capturing time interval being an exposure time interval;
    a position measurement system configured to repeatedly ascertain an instantaneous position of the sensor; and
    an evaluation device receiving each ascertained position output by the position measurement system at a first predetermined point in time,
    the sensor being further configured to output to the evaluation device at a second predetermined point in time a sensor measurement signal including information captured during the capturing time interval, to determine based on the sensor measurement signal a distance value, and to continuously adjust a duration of the exposure time interval in accordance with a reflectance of the object, and
    and the evaluation device being configured, for at least one capturing time interval, to:
    determine a point in time of the capturing of the object which lies within the capturing time interval;
    ascertain position values output at points in time which include the point in time of the capturing of the object;

ascertain a position main value based on the position values which approximates a position of the sensor at the point in time of the capturing; and combine the position main value and the distance value a coordinate value of the object is determined.

* * * * *